United States Patent Office 3,024,102
Patented Mar. 6, 1962

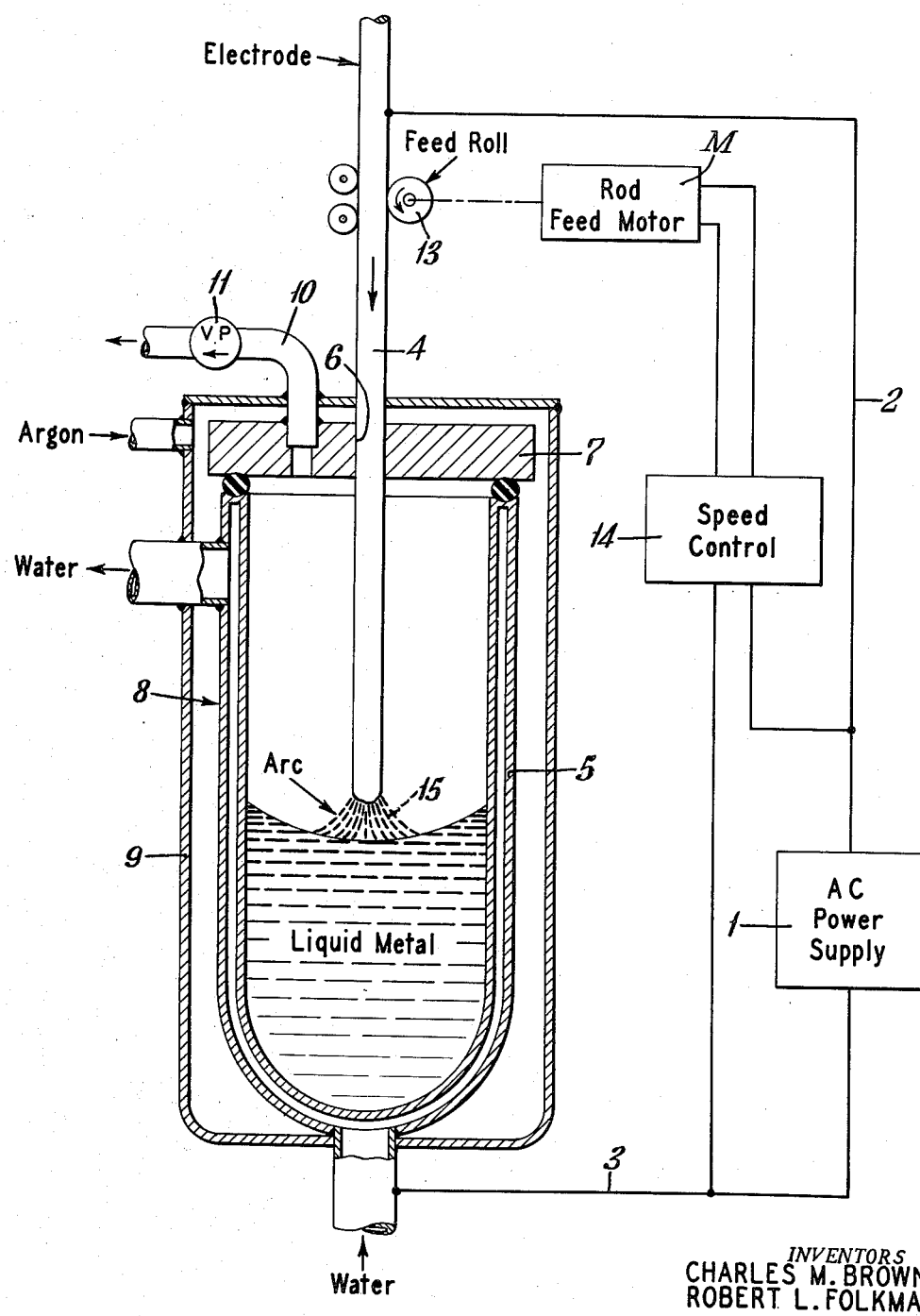

3,024,102
HIGH-VACUUM TITANIUM A.C. ARC MELTING
Charles M. Brown, Lewiston, and Robert L. Folkman, Eggertsville, N.Y., assignors to Union Carbide Corporation, a corporation of New York
Filed Mar. 16, 1956, Ser. No. 571,911
6 Claims. (Cl. 75—10)

This invention pertains to consumable electrode arc melting of high-melting reactive metals such as titanium. More particularly, however, the invention concerns a novel practice whereby decided improvements are obtained in arc melting such metals and alloys at extremely low pressures (less than 1000 microns) using alternating current at commercial power frequency.

When consumable electrodes fabricated from the reactive, high-melting point metal or alloys of titanium are arc melted under very low pressures using A.C., the arc is extinguished every half cycle. The greatly reduced number of electrons and ions which are present in the vicinity of the arc at low pressures on the order of 1 to 1000 microns make reignition of the arc uncertain.

The present invention facilitates reignition of the arc at both half cycles by introducing into the arc zone, either as an element or as an ionizable compound, a substance having a lower ionization potential than the metal or alloy being melted.

By way of illustration, consumable electrodes compacted from titanium sponge, when containing from about 0.05 to 0.5% (by weight) of sodium as sodium chloride, produce extremely stable arcs when they are arc melted at very low pressures with alternating current. Larger amounts of sodium may be present but offer little advantage.

Many metals and alloys are prepared from their respective raw materials in a form from which ingots are generally produced by arc melting. The practice of arc melting reactive, high-melting point metals and alloys in an arc furnace with a non-consumable electrode recently has, in part, given way to consumable electrode melting, wherein the metal or alloy powders or sponge are compacted to form elongated rods. Such rods are fed into an arc melting furnace and act as one terminal of the electrical circuit, the crucible generally forming the other, and an arc is established between the two. The electrode material is consumed in the heat of the arc and ingots are built up to the desired size as the electrode is progressively fed and melted in the furnace. Massive ingots of metals and alloys can thereby be formed with comparative ease from small-particled or spongy metals.

Arc melting was initially performed in an inert gas atmosphere to protect the molten metal from contamination with oxygen and nitrogen in the air. Although inert gas-shielded arc melting is still employed, it has been replaced to a large extent by melting under moderately reduced pressures, such as from 1 to 300 mm. (1000 to 300,000 microns). A decided improvement was immediately evident in reduced pressure melting as compared with one atmosphere pressure inert gas melting since some of the volatile materials in the electrode were removed in the heat of the arc and were withdrawn from the furnace chamber by the evacuating apparatus.

Direct current has been and is still generally employed in arc melting. In direct current consumable electrode arc melting under high vacuum, however, the control of electrode feed rate is exceedingly difficult because there is no apparent change in the arc voltage with the arc length. Thus, since arc voltage does not increase with arc length, as it does at higher pressures, the operator does not know when to feed in additional electrode to maintain optimum arc length. Only extraordinary skill on the part of the operator would prevent jamming the electrode into the melt occasionally, thereby shorting the circuit, or preventing the arc from becoming so long as to go out or extinguish.

A more controllable melting operation might be obtained by the use of alternating current under high vacuums, since a definite relationship between arc voltage and arc length exists when this type of current is employed. Automatic control of the electrode feed rate by the length of the arc, as measured by arc voltage, eliminates the difficulties present in direct current arc melting at very low pressures.

Oscilloscope traces studied during A.C. arc melting, however, indicate that the arc is extinguished and must reignite every half cycle. Reignition of the arc, however, becomes more difficult as the pressure in the arc melting furnace is decreased since fewer electrons and ions are present to form a conducting path for the current between the electrode and the melt. The fact that there must be reignition of the arc during each half cycle in ordinary A.C. high-vacuum arc melting is one of the important factors which prevented such highly advantageous arc melting method from being more widely used. Any improvement in this type of melting, by which reignition of the arc may be facilitated in order to attain a controllable operation which would be adaptable to commercial practice, would be a decided contribution to the art of melting titanium and its alloys.

The primary object of the present invention is to provide means of assuring a controllable, safe, and smooth arc melting operation and, further, to provide the means by which an A.C. arc in arc melting under high vacuum may be maintained for an indefinite period with no likelihood of the arc extinguishing each half cycle or not reigniting immediately.

The above and other objects are achieved by our invention. When a minute quantity of an element having a lower ionization potential than that of the titanium metal or alloy being melted is present in the arc area, we believe that such an element will ionize in the heat of the arc and provide sufficient ions and electrons to permit immediate reignition of the extinguished arc each half cycle. The ionization of the element is continuous and cumulative, and thereby stabilizes the arc in pressures measured in microns. The arc, during melting under high vacuums using alternating current, wherein such low ionizing elements are present, is characterized by extreme stability and an uninterrupted arc-melting operation. In addition, the ingots resulting from arc melting consumable electrodes at low pressures, in which minor percentages of readily ionizable elements are present, are characterized by a minimum level of the ionizable elements.

In the drawing, the single FIGURE is a diagram illustrating apparatus for arc melting metal according to the invention.

As shown in such drawing an alternating current source 1 of electrical power is connected by leads 2 and 3 to arc electrodes 4 and 5. The electrode 4 is the form of a bar or rod, while electrode 5 is in the form of a crucible of water-cooled copper. Electrode 4 projects through a suitable opening 6 in the cover 7 of a closed furnace 8 disposed within an inert gas chamber 9. The interior of the furnace 8 is connected by a pipe 10 to a vacuum pump 11 that is capable of maintaining the gas pressure within the chamber at values of less than 1000 microns.

The electrode 4 may be fed toward the crucible 5 by means of a rod feed mechanism 13 that is driven by a motor M. Such motor may be controlled by a control device 14 which is responsive to variations in the voltage or potential between the electrodes 4 and 5 for the purpose of regulating the length of an alternating current arc 15 in furnace 8 by regulating the feed of the electrode 4.

As pointed out above, commercial arc melting of consumable titanium electrodes is carried out in an atmosphere of inert gas, such as argon, over a wide range in pressures and using direct current. There is, however, a definite limitation in the use of direct current in that at very low pressures there is no apparent relationship between arc voltage and arc length, making control of electrode feed exceedingly difficult. This difficulty can be overcome through the use of alternating current since a definite relationship between arc voltage and arc length exists even at pressures of less than 1000 microns.

In prior alternating current melting, however, the arc is extinguished and must be reignited every half cycle. Reignition of the arc becomes very difficult with lowering pressures since fewer electrons are present to form a conducting path. We have discovered that the presence of sodium as sodium chloride equivalent to 0.05 to 0.5% of the weight of electrode being melted substantially improves the stability of the arc. This is believed due to the low ionization potential of sodium. Elements of the alkali metal series in addition to sodium, such as cesium, potassium, lithium, etc., all of which have lower ionization potentials than titanium, serve equally well. Magnesium, which has a higher ionization potential than titanium, has no effect.

In the illustrated example of the invention the electrode 4 is composed of titanium sponge having incorporated therewith a small amount of sodium which has the effect of lowering the ionizing potential of the arc 15 to such an extent that a full-wave alternating current flows therethrough without any half-wave rectification. This, in turn, provides a stable operation in which the arc length is proportional to the arc voltage, so that the melting operation can be controlled without any trouble after the arc is struck at the end of electrode 4.

Experiments were conducted by us wherein titanium sponge, compacted to 2-inch square electrodes and containing sodium, as sodium chloride, in percentages ranging from 0.003 to 0.250, was arc melted to form ingots. The electrodes were melted into a 6-inch diameter crucible at 10 microns pressure using alternating current, 30 to 40 volts, 2800 to 3000 amperes. Those electrodes which contained sodium as chloride, equivalent to 0.003 to 0.007% by weight of the electrode being melted did not exhibit arc stability; poor results were obtained. The arc which was produced when 0.03% sodium as chloride was present showed improvement in stability. The arcs produced when 0.065 to 0.250% sodium, as chloride, was present, however, were extremely stable, and the arc melting was performed without interruption. It can only be deduced that the ionized particles of sodium aided the reignition of the arc in the high vacuum.

Similar experiments were conducted wherein magnesium, as magnesium chloride, was present in quantities ranging from 0.10 to 0.25%. The results obtained indicated that the presence of magnesium had no beneficial effect in stabilizing the arc. It can only be assumed that the higher ionization potential of magnesium with respect to titanium, and the resultant absence of any marked increase of ionized particles in the arc, was the cause. Barium, however, having an ionization potential lower than that of titanium will effectively stabilize the arc.

Further experiments fully substantiated the benefits derived in A.C. arc melting at very low pressures when minor percentages of elements having lower ionization potential than that of the material being melted were added to the arc zone. Approximately 0.10% of each of barium, cesium, potassium, and lithium, all as chlorides, was added individually to titanium sponge; sodium was also added in the form of nitrate and bromide salts. The consumable electrodes so made were melted at from 5 to 20 microns pressure using alternating current. The A.C. arc was extremely stable and the melting proceeded uninterrupted in each case.

The broad range in which the ionizable elements may be added, i.e., from 0.03 to 1.00%, may be varied somewhat depending upon the geometry of the furnace. That is, the ratio of electrode diameter to crucible diameter may change the absolute limits of the range.

What is claimed is:

1. The method of arc melting titanium and its alloys, which comprises connecting a consumable electrode of the metal or alloy to be melted to one side of an alternating current source of electrical power, connecting another electrode in the form of a crucible to the other side of such source, arranging such consumable electrode together with a substance having a lower ionization potential than that of titanium in such crucible within a closed furnace, reducing the pressure within such chamber to a value between 1 and 1,000 microns of mercury, striking an alternating current arc between such electrodes, melting with such arc the titanium or its alloy, and feeding such consumable electrode toward such arc as such melting progresses while continuously supplying said substance to such arc, the effect of said substance on such arc being to assure under such low pressure full-wave alternating current operation of the arc which is characterized by a definite relationship between the arc voltage and arc length, which provides means for accurately controlling the feed of such consumable electrode as it is consumed by such arc.

2. The method of arc melting titanium and its alloys according to claim 1, in which the substance added to the titanium is selected from the group consisting of alkali metals such as sodium, cesium, potassium, and lithium, and a suitable alkaline earth metal such as barium.

3. The method of melting titanium and its alloys according to claim 2, wherein the substance is 0.03 to 1.00% by weight of the electrode being consumed.

4. The method of arc melting consumable electrodes composed of reactive metal by means of an electric arc in an inert gas under sub-atmospheric pressure with alternating current; which comprises incorporating with the electrode of such metal a substance having a lower ionization potential than that of such metal; inserting one end of said electrode in the crucible of an inert gas furnace; lowering the pressure of the interior of such furnace to a value between 1 and 1,000 microns of mercury; connecting such crucible and said electrode to an alternating current source of electric power; striking an alternating current arc between such electrode end and a starting melt in such crucible; melting the end of said electrode with such arc; and progressively feeding said electrode toward such arc as the latter melts the end of the electrode; the effect of such lower ionization potential substance in such electrode being to improve the stability of such arc by overcoming half-wave rectification of the alternating current that would otherwise occur under such low pressure condition; and the effect of the resulting full-wave alternating current arc being to improve the control of such electrode feed by virtue of the substantially definite relationship between the arc voltage and arc length thereof under such low pressure condition.

5. The method of arc melting metals as defined by claim 4, in which the metal to be melted is titanium or an alloy thereof; and the lower ionization potential substance is a sodium salt.

6. The method of arc melting metals as defined by claim 4, in which the electrode is compacted from titanium sponge and 0.05 to 0.5% sodium as sodium chloride.

(References on following page)

References Cited in the file of this patent

UNITED STATES PATENTS

| | | |
|---|---|---|
| 2,541,764 | Herres et al. | Feb. 13, 1951 |
| 2,702,239 | Gilbert et al. | Feb. 15, 1955 |
| 2,727,937 | Boyer | Dec. 20, 1955 |

OTHER REFERENCES

Maddox et al.: Journal of Metals, "Ductile Titanium," vol. 188, April 1950 (pp. 634–640; page 640 relied on).

Simons et al.: Metal Progress, "Arc Melting of Titanium," February 1949 (pages 197–200; page 198 relied on).